April 7, 1959      M. J. G. TIPPER      2,880,419
APPARATUS FOR FASTENING CASINGS WITH STAPLE-LIKE FASTENERS
Filed Nov. 22, 1957      4 Sheets-Sheet 1
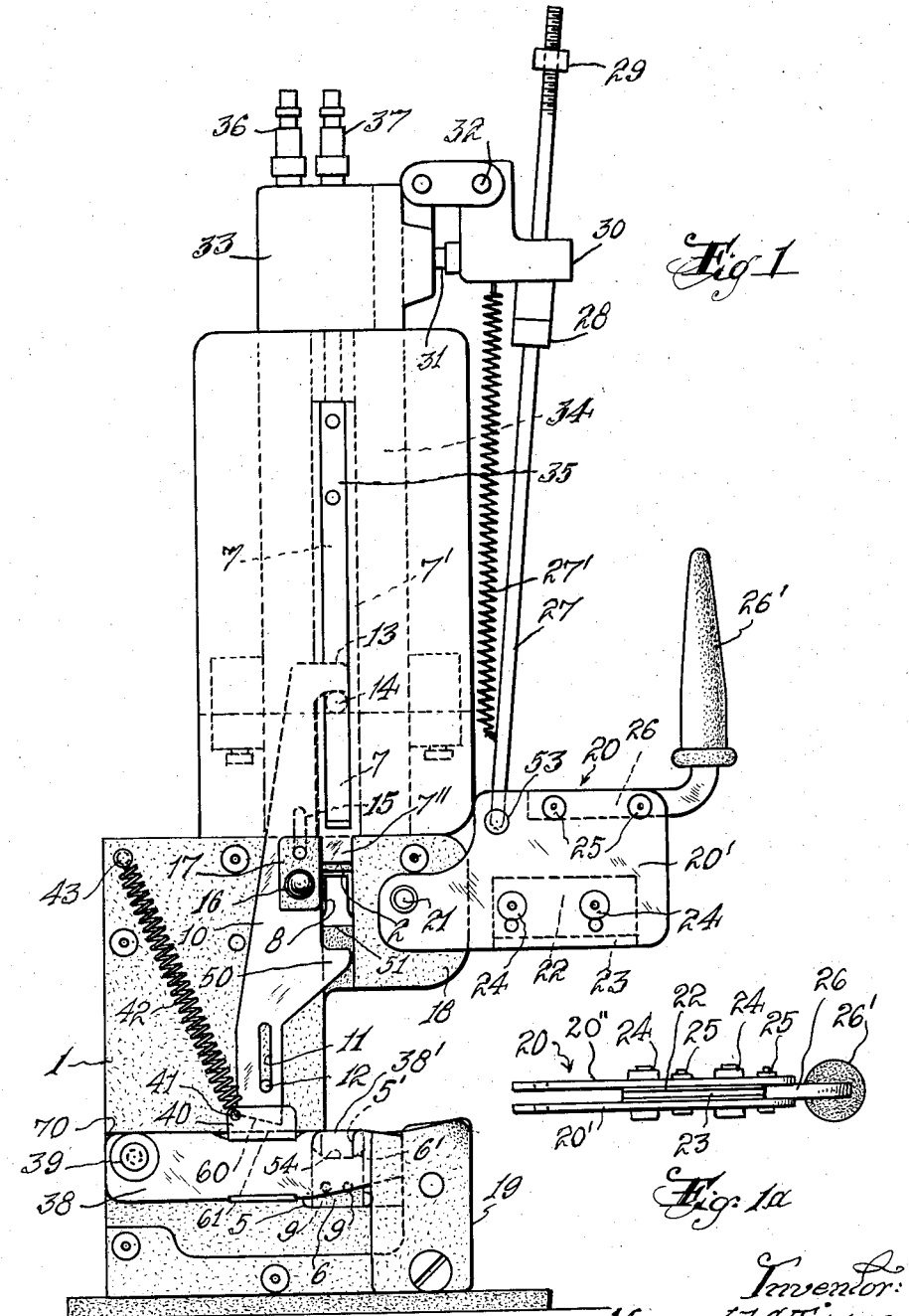

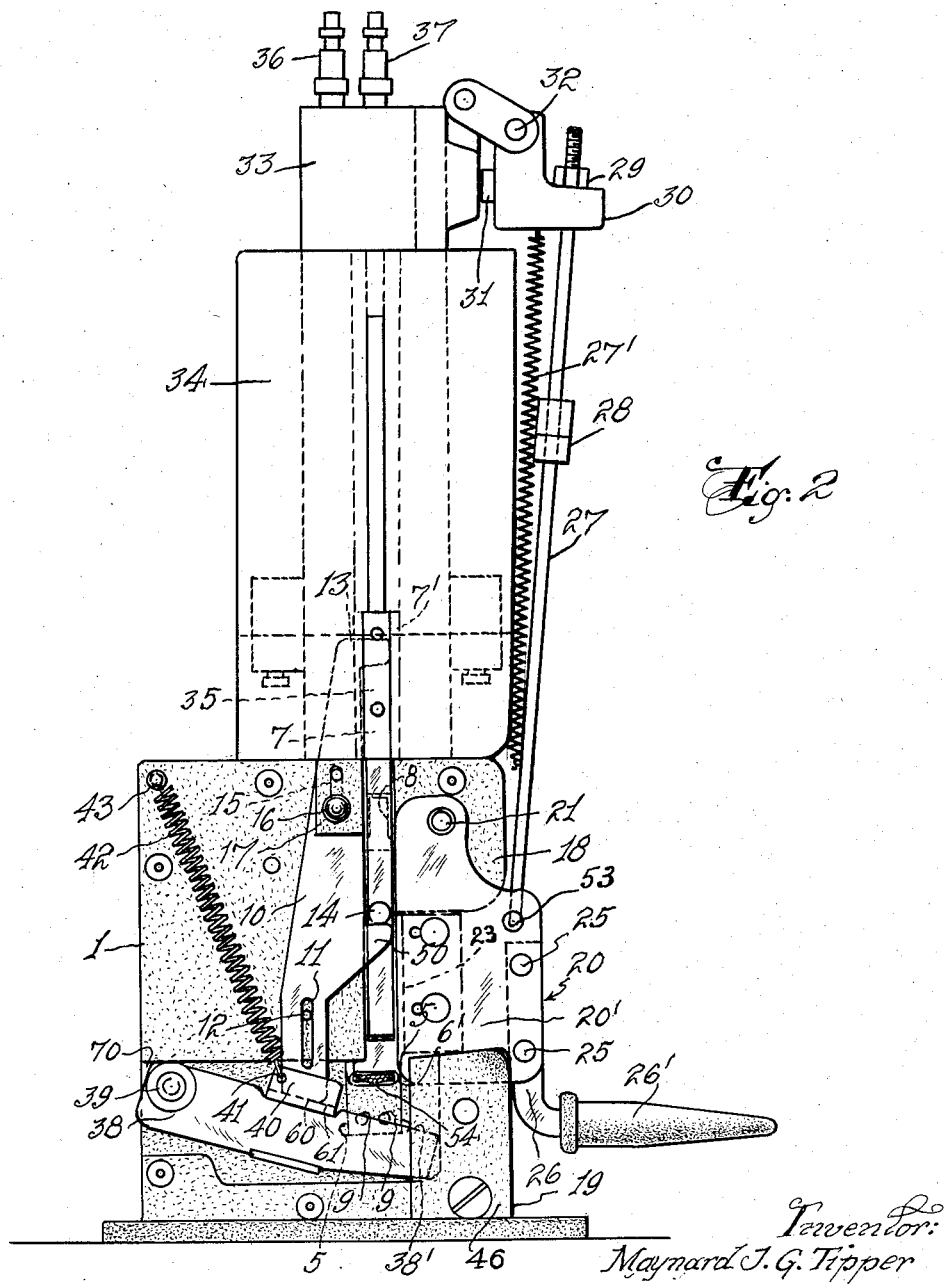

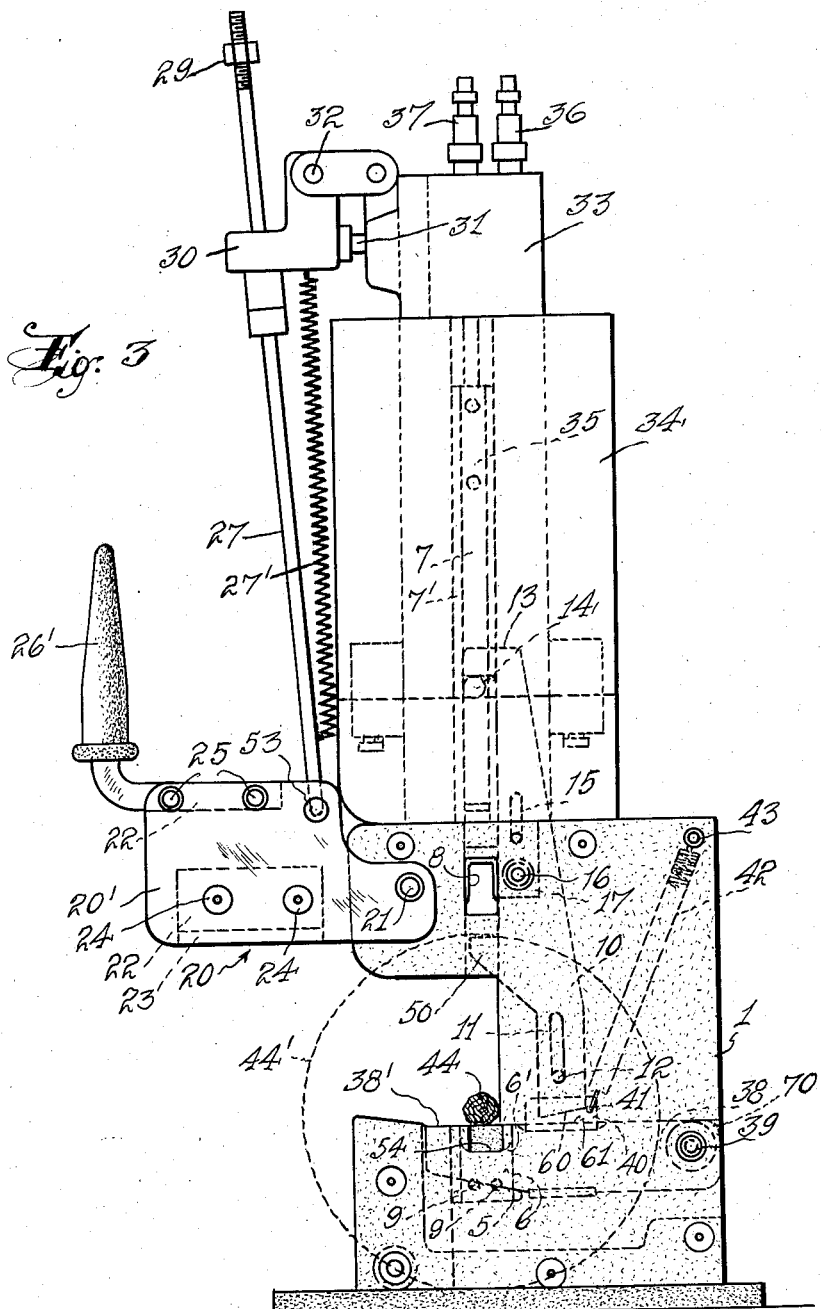

April 7, 1959 M. J. G. TIPPER 2,880,419
APPARATUS FOR FASTENING CASINGS WITH STAPLE-LIKE FASTENERS
Filed Nov. 22, 1957 4 Sheets-Sheet 4
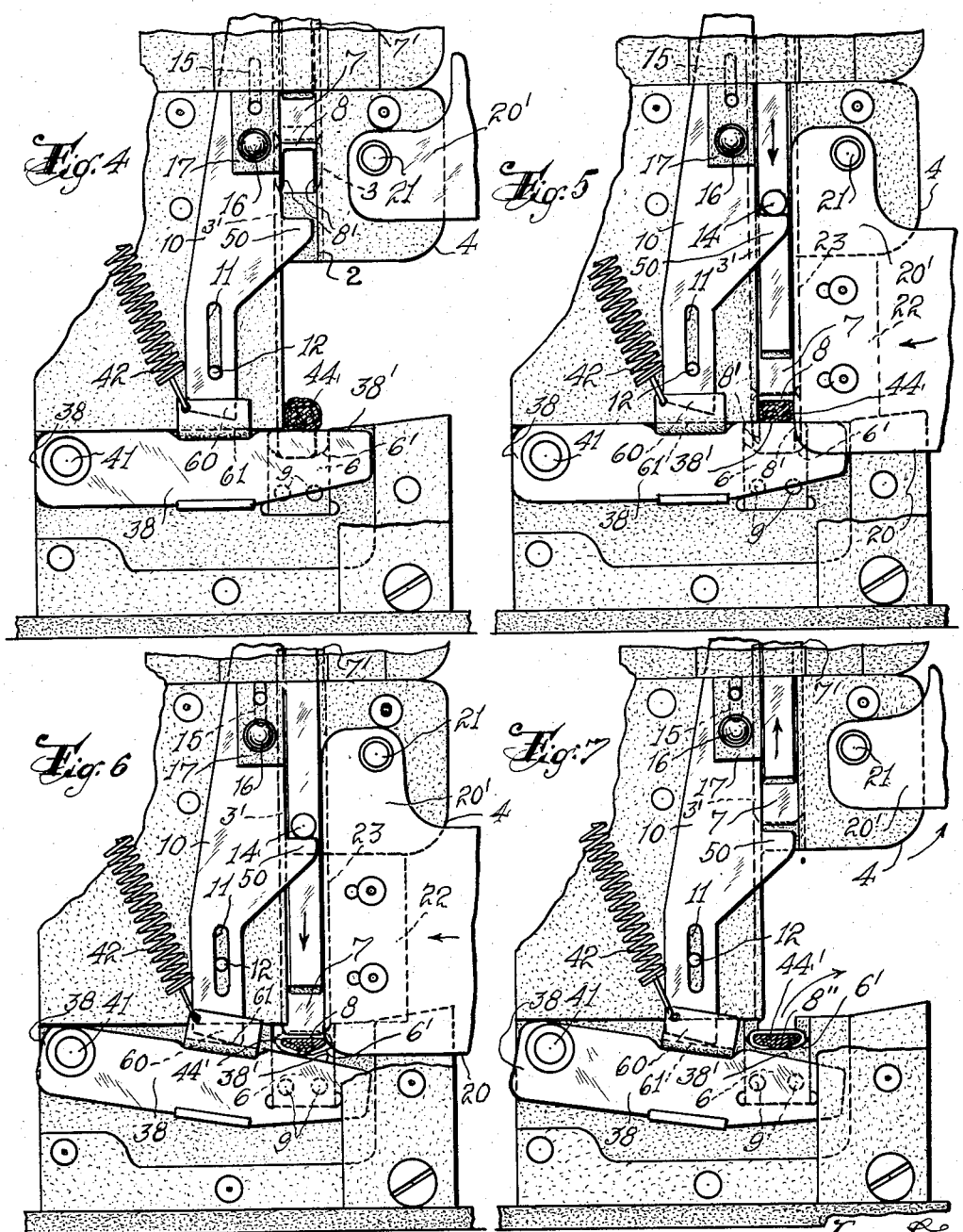
Inventor:
Maynard J. G. Tipper
By Peter J. Taylor
Attorney

United States Patent Office 2,880,419
Patented Apr. 7, 1959

2,880,419

APPARATUS FOR FASTENING CASINGS WITH STAPLE-LIKE FASTENERS

Maynard J. G. Tipper, Castro Valley, Calif., assignor to Tipper Tie Products of New Jersey, Inc., Union, N.J., a corporation of New Jersey Application November 22, 1957, Serial No. 698,157

5 Claims. (Cl. 1—3)

This invention relates to a device for applying a fastener to the end of a casing, such as a sausage casing. More specifically, it deals with a machine for applying a staple or staple-like fastener which is pressed closed between two dies, and having a gate means for holding the casing end above the upper die while the fastener is positioned around the casing prior to its clinching thereon. One novel feature of the present invention includes a novel gate actuating arm. Another important feature is a novel combination casing gathering and powering throat-closing lever. Other features are also present and will be made apparent in the disclosure which is to follow.

Machines have been placed on the market for fastening the first or dry end of a casing prior to filling of the casing. They have not been adapted for fastening the second or wet end after the casing has been filled, and each wet end has been fastened by hand-tying with string.

In copending application Serial No. 637,993, filed on February 4, 1957, by Maynard J. G. Tipper, a machine was described for applying a staple fastener to either the first or second end of the casing. This machine featured a pair of vertical dies, including a movable upper die, between which the fastener was crimped onto the casing end. A gate operated by the upper die was provided to hold the casing above the lower die until the fastener was positioned around the casing prior to the clinching operation, whereupon the gate was lowered immediately prior to the clinching operation.

The present invention involves a similar machine having a number of novel features which improve considerably the gate operation and simplify greatly the fastening process. The invention will be more readily understood by reference to the accompanying drawings in which a preferred embodiment, and various important features thereof, are depicted. Figure 1 illustrates a front view of the entire machine in idle position. Figure 1a is a side view of the throat closure lever. A front view of the essential features of the same machine as that depicted in Figure 1 in casing-fastening position, is shown in Figure 2. Figure 3 presents a rear view of the essential features of the machine of Figure 1 with casing end in position for fastening. Figures 4, 5, 6 and 7 are schematic front views illustrating the positions of the various essential features of the invention in successive stages of the casing fastening operation. Similar numerals relate to similar parts in the various figures.

Referring again to the drawings, numeral 1 represents a flat base plate having an open throat position 4 permitting access to the centrally-disposed opening 54 cut in plate 1 on which the casing end lies during the final stages of fastening thereof. A vertical channel groove 2—2' in plate 1 (Fig. 4) is disposed directly above opening 54. Vertically-reciprocating plunger or driver 7 rides in inner recess or grooves 3—3' of channel 2—2', and its lower end is provided with arcuate-shaped (upper) die 7". Sides 7' of driver 7 are provided with narrow shoulders to serve as guides against channel edges 2—2'.

Staple fasteners 8 are fed into channel 2—2' through opening 51. The fasteners are preferably mounted in glued-stick form on a rod (not shown) disposed in line, with opening 51 and extending at right angles from the rear of plate 1 (Fig. 3), as in the aforesaid application Serial No. 637,993. These do not form a part of the present invention.

In front of opening 54 and cut out of the front portion of plate 1 is a wider and longer slot 5—5' into which is inserted lower die 6 having a concave die edge 6' which roughly complements arcuate die edge 7" of driver 7. Die 6 is fastened within groove 5—5' by screws 9 and its upper die edge 6' is disposed slightly lower than the lower edge of opening 54.

Gate 38 having a straight upper edge 38' is fastened in vertically-swivelling relation to grooved portion 70 of the lower part of plate 1 at 39 and, when closed, gate 38 covers die 6 and its upper edge 38' is disposed above the die edge 6' of lower die 6. Gate 38 is maintained in closed position by spring 42 fastened at one end to plate 1 at 43 and at its other end to projection 40 at 41. The purpose of projection 40 on gate 38 is merely to cover moving end 60 of gate-actuating arm 10 for safety reasons. However, the upper edge of gate 38 is provided with a contact surface 61 for effecting the thrust action of end 60 of gate-actuating arm 10.

Vertically-reciprocating arm 10 has an upper hooked end 13 disposed above pin 14 which projects forwardly from driver 7. It also has another hooked portion 50 disposed below pin 14 and below opening 51 in base 1. It is apparent that pin 14 will contact hooked portion 50 on the downward stroke of driver 7, thus pushing down arm 10 and can contact hooked portion 13 on the upward stroke of driver 7, causing arm 10 to be pushed upwardly. Hook 13 also may serve as a stop for the upward motion of driver 7. Arm 10 is provided with vertical slot 15 over which is disposed friction plate 17 which is held tightly over arm 10 by spring-loaded screw 16. Thus, by compressing screw 16, plate 17 will be made to retard the action of spring 42 upon gate 38. Vertical slot 11 is provided on the lower portion of arm 10. Pin 12 projecting from plate 1 rides in slot 11 and serves to guide arm 10. The lower portion of arm 10 is provided with a thrust end 60 for impressing a thrust on the upper edge portion 61 of gate 68 to force the gate down against the action of spring 42 when arm 10 is depressed by pin 14 on driver 7. Cover 46 (Fig. 2) is fastened to plate 1 by screws and its purpose is to protect the operator from the moving parts.

A throat closing lever having front plate 20' and back plate 20" straddling base plate 1 is pivoted onto upper wing 18 of base plate 1 at 21, and it serves to close throat 4 between wings 18 and 19 of base plate 1, to serve as a guide for driver 7 and to gather and hold loose portions of casing end 44 of sausage 44' (Fig. 3) prior to application of fastener 8 thereto. Arm 26 attached to plates 20' and 20" is curved to hold handle 26' on its end and facilitate raising and lowering of the lever by the operator. Its open edge (Fig. 1a) is provided with slot 23 to accommodate one leg of a fastener and a sliding edge 7' of driver 7 when lever 20 is brought down into full throat-closing position as in Figure 2. As is apparent from Figure 5, lever 20 also serves to gather loose ends of casing end 44 prior to dropping thereover of staple fastener 8. Another purpose served by lever 20, as depicted by Figure 1, is to actuate pneumatic valve 30—31 by the downward movement of rod 27 (swivelly attached at 53 to plates 20'—20") so as to cause air-driven motor 33 to force down piston 35 in cylinder 34, to which piston end is attached driver 7. Adjusting nuts 28 and 29 are provided on actuating rod 27 for adjustment of the piston action with respect to the position of lever 20, it being desirable to actuate driver 7 on its downward stroke when lever 20 is pressed fully in throat-closing position, and to actuate driver 7 on its upward position as soon as fastener 8 has been completely crimped onto casing end 44 and lever 20 has begun to be pulled away from throat 4. Numeral 32 represents the swivel mounting for valve actuating lever 30, and numerals 36 and 37 represent the compressed air inlet and outlet for air motor 33.

In operation, the machine (being in idle position, as in Figure 1), is ready for insertion of casing end 44 which is placed over closed gate edge 38', as in Figure 4. Driver die 7" is disposed above staple 8 and arm 10 is in raised position with hooked end 13 disposed over pin 14 on driver 7. Then, lever 20 is lowered by hand until it completely closes throat 4, whereupon rod 27 actuates motor 33 to force down driver 7 which pushes fastener 8 beneath it, as in Figure 5. The legs of fastener 8 ride in channel grooves 3—3', as well as in groove 23 of lever 20. Since the casing will be disposed between the outer channel edges 2—2', legs 8' of fastener 8 will not engage any part of the casing, but will circumscribe it and the ends of fastener legs 8' will rest on the concave edge 6' of lower die 6. Since gate edge 38' is held in closed position by the action of spring 42, casing end 44 will be in raised position and disposed above die edge 6' when driver die 7" begins to crimp fastener 8. As this occurs, legs 8' begin to curve toward each other due to the curvature of die edge 6', and after the legs have butted against each other, pin 14 imposes a thrust upon protruding hook 50 of arm 10 as driver 7 continues on its downward movement. This action causes lower end 60 of arm 10 to press into edge portion 61 of gate 38, thereby lowering gate edge 38' against the force of spring 42, as in Figure 6. The casing then rests on the bottom edge 54 of the opening in plate 1.

When fastener 8" is completely clinched onto fastened casing end 44", as in Figure 7, lever 20 is pulled away from throat 4, and driver 7 begins its upward movement due to the action of stop 28 upon air valve 30—31. Upward movement of arm 10 is delayed, however, due to the friction of plate 17 upon the arm, since plate 17 is held tightly in contact therewith by spring-loaded screw 16. As driver 7 nears the top on its return stroke, pin 14 contacts hook 13, raises arm 10 and allows gate 38 to close after the casing has been removed. The amount of delay in the resetting or closing of gate 38 is governed by restriction in the air-exhaust line 36 from the air cylinder. In a short time, the action of spring 42 causes gate 38 to push arm 10 against the friction effect of plate 17. The spacing between hooked portions 50 and 13 of arm 10 is such that pin 14 would raise arm 10 when it completes its upward return movement. This delayed action in the return of arm 10 gives the operator time to remove the fastened casing. The position of the new casing will be the same as in Figure 4 with the exception that a new staple is pushed through opening 51.

Although the machine has been described as fastening a casing, it may also be employed for closing stockinette, polyethylene and other types of plastic bags used for enclosing poultry, fibrous or cotton bags in casings, and the like. It is possible to insert a pre-tied string loop over the casing end prior to fastening to provide a hanger for the fastened product.

I claim:

1. A machine for fastening a casing end with a staple fastener comprising a flat vertical base plate having a throat opening in a side edge of said plate and forming an upper side wing and lower side wing in said plate adapted for sidewise positioning of the casing end, a lower clinching die plate having a concave upper edge and disposed in the lower side wing of said plate, a channel disposed in the upper side wing above and in line with the lower die, guide slots on said channel sides, a reciprocable driver disposed in said channel and guided therein by said slots, serving to drive said fastener down the channel, a flat-sided upper die serving as a lower terminus of said driver, an opening through said base plate in said channel for providing ingress of a staple, a forwardly projecting pin disposed on said driver, a flat gate resiliently and swivelly mounted on said plate and having an upper edge normally extending horizontally over the lower wing of said plate disposed above the lower die edge so as to suspend the casing end above said edge, a vertically slidable arm mounted on said plate above said gate adjacent said channel and having means projecting over said channel to be engaged by said pin and means for exerting a thrust upon the upper edge of said gate whereby when said engaging means is engaged by said pin on the downward stroke of said plunger the gate is lowered during the clinching of the fastener, a throat-closing lever pivotally mounted on the upper wing on said plate for closing said throat adjacent said channel and for gathering said casing end disposed in said throat, said lever having a grooved straight side to serve as a guide for said fastener and driver when said lever is in throat-closing position, a handle on said lever, and means for reciprocating said driver when said lever is in throat-closing position.

2. A machine for fastening a casing end according to claim 1 in which there is attached to said lever means for controlling the reciprocating means when said lever is in throat-closing position.

3. A machine for fastening a casing end according to claim 1 in which said arm has an engaging means on its upper end for engaging said pin on the upward stroke of said plunger.

4. A machine for fastening a casing end according to claim 1 in which said arm has restraining means for temporarily restraining said arm against returning when said plunger is on its upward stroke.

5. A machine for fastening a casing end according to claim 4 in which said restraining means includes a vertical slot in said arm, a screw fixed to said base plate and projecting through said slot, a flat friction plate mounted over said screw and a spring-loaded nut on said screw holding said friction plate tightly against said base plate.

No references cited.